July 26, 1966 G. A. DAVIS 3,262,196
METHOD OF AND APPARATUS FOR PRODUCING MARGINALLY BONDED SPACED PLATE AND LIKE STRUCTURES AND THE PRODUCT THEREOF
Filed July 13, 1960
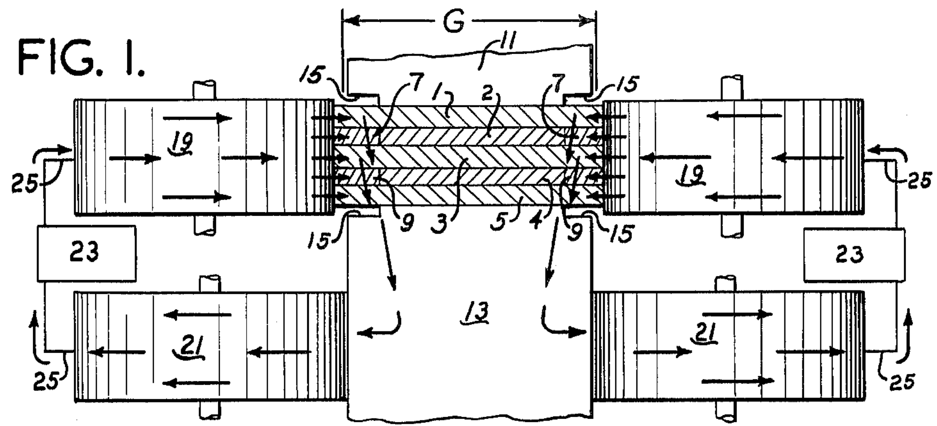
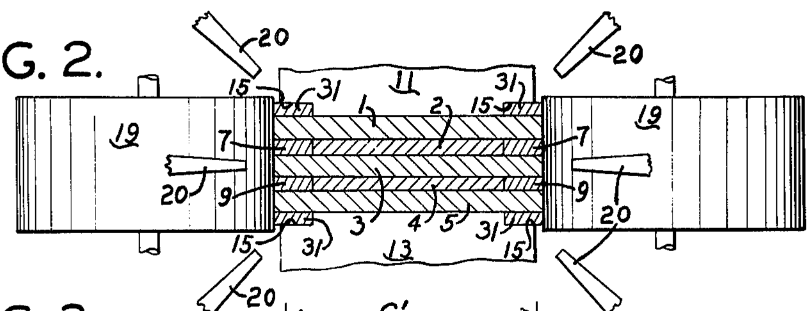
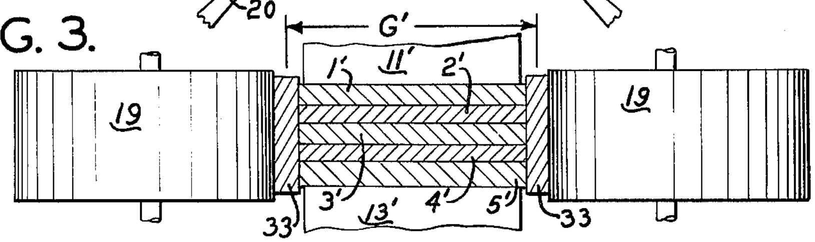
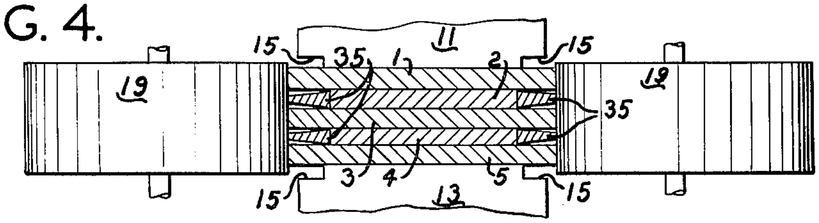
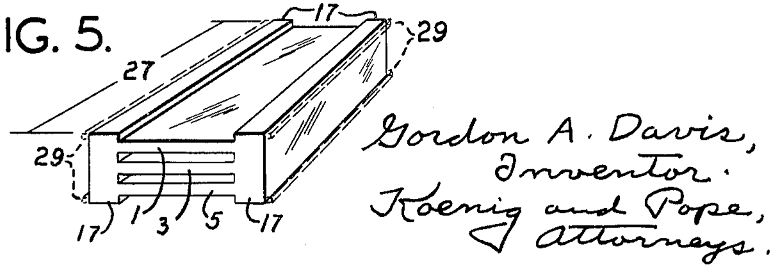
Gordon A. Davis,
Inventor.
Koenig and Pope,
Attorneys.

3,262,196
METHOD OF AND APPARATUS FOR PRODUCING MARGINALLY BONDED SPACED PLATE AND LIKE STRUCTURES AND THE PRODUCT THEREOF

Gordon A. Davis, Attleboro, Mass., assignor to Metals & Controls Inc., a corporation of Massachusetts Filed July 13, 1960, Ser. No. 42,697
16 Claims. (Cl. 29—471.1)

This invention relates to a method of and apparatus for producing marginally bonded, spaced-plate and like structures and to the product thereof, and with regard to certain more specific features, to such methods and apparatus for fabricating marginally bonded spaced-plate assemblies for critical structures of this type such as nuclear fuel elements, composed of an alloy such as Zircaloy.

Among the several objects of the invention may be noted the provision of methods of and apparatus for producing highly reliable and accurately formed spaced-plate or like structures having improved marginal spacing means or flanges and improved bonds therebetween; the provision of a simple and rapid method for producing such structures; and the provision of a method which may be performed with comparatively simple apparatus, whether or not a protective atmosphere is required. Other objects and features will be in part apparent and in part pointed out hereinafter.

The invention accordingly comprises the elements and combinations of elements, materials and combinations of materials, the steps and sequence of steps, features of construction and manipulation, and arrangements of parts which will be exemplified in the methods, apparatus and products hereinafter described, and the scope of which will be indicated in the following claims.

In the accompanying drawings, in which several of various possible embodiments of the invention are illustrated, FIG. 1 is a diagrammatic view illustrating one form of the invention;

FIGS. 2, 3 and 4 are views corresponding to parts of FIG. 1, illustrating alternative forms of the invention; and FIG. 5 is a perspective view of an assembly made according to the invention, the dotted lines illustrating certain removed flashings.

Corresponding reference characters indicate corresponding parts throughout the several views of the drawings.

Heretofore, certain critical spaced-plate structures such as assemblies for nuclear fuel elements composed of zirconium alloy have required tedious, time-consuming and costly methods of construction consisting, among other things, in flanging opposite edges of individual plates and welding along abutments between the flanges while the plates were located as a subassembly in a controlled atmosphere of substantial extent. Two welds were required for the first pair of plates combined, and two additional welds for each single additional plate to be included in an assembly. Welding under any required controlled atmosphere conditions was difficult because an entire assembly was required to be immersed in the controlled atmosphere while being welded. Moreover, the former method resulted in seams which many times were not of the metallurgical quality and reliability obtained by means of the present invention.

According to the present invention, welding is accomplished without the requirement for a separate preliminary marginal upsetting operation on the plates. The new welding operation in and of itself is rapidly accomplished. Moreover, it simultaneously incorporates therewith the required flanging step or its equivalent. In addition, in cases wherein a controlled atmosphere is required, its maintenance at the welding region may be more conveniently arranged in a smaller encompassing space.

Referring now more particularly to FIG. 1 of the drawings, numerals 1, 3 and 5 illustrate a plurality (three, for example but without limitation) of Zircaloy plate elements to be spaced. One form of Zircaloy useful for the fuel elements desired is a malleable alloy, consisting by weight of 1.5% tin, 0.12% iron, 0.10% chromium, 0.05% nickel and the balance zirconium. This is a type of alloy in connection with which the present invention is described, but it will be understood that other metals or alloys which are malleable may be employed. The term malleable metal as used herein includes malleable alloys.

Between the plates 1, 3, 5 (FIG. 1) are sandwiched or interleaved temporary or expendable narrower supporting filler or spacer plates or elements 2 and 4, composed, for example, of stainless or cold rolled steel, or a nonmetallic material such as a ceramic. These plates are of individual thicknesses substantially equal to the ultimately desired spaces between plates 1, 3, 5 in the final structure. Marginally abutting the expendable spacer plates 2 and 4 are spacer elements such as strips or ribbons 7 and 9, which also may be composed of Zircaloy. The marginal strips 7 flank the spacer plate 2, and the marginal strips 9 flank the spacer plate 4. Members 2 and 7 on the one hand and members 4 and 9 on the other hand may be of approximately equal thicknesses. In some instances strips 7 and 9 may be somewhat thinner than plates 2 and 4, respectively. The adjacent outer margins of members 1, 7, 3, 9 and 5 are preferably flush, as shown in FIG. 1. Members 1–5, 7, 9 are preferably equal in lengths.

At numerals 11 and 13 are shown rectangular backing dies, the edges of which are provided with notch-forming grooves as illustrated at 15. The depths and widths of these notches are such as to produce a matrix which will form flanges 17 on the final product, as shown in FIG. 5. If these flanges 17 are not desired, then the notches 15 may be omitted.

The width of each die 11, 13 is somewhat less than the width of the assembly 1–5, 7, 9. The length of each die perpendicularly to the plane of the drawings is slightly greater than the expected length 27 of an assembly such as suggested in FIG. 5. The dies are clamped against opposite faces of the plates 1 and 5 with sufficient pressure strongly to hold together as an assembly all of the clamped elements 1–5 and, if desired, elements 7 and 9. Any suitable clamping means (not shown) may be used that may be portable with the clamped dies, such as bars with draw bolts or the like.

At numerals 19 are shown conventional opposite electrically conductive water-cooled pressure rolls which may be those of a suitable rolling mill (not shown) which has the usual arrangements for driving and adjusting the rolls to various gaps therebetween for accepting materials to be rolled under pressure with opposing forces. Thus rolls 19 are located at a roll station. At numerals 21 are shown current collector rolls, which may also be water-cooled, adapted to engage opposite sides of the die 13. At numeral 23 is illustrated an electric power source and at 25 conventional current collector means for each of the pairs of rolls 19 and 21.

The rolls 19 in FIG. 1 are shown for illustration as being set with an initial nonsqueezing gap as related to the width of the assembly 1–5, 7, 9.

Operation is as follows, assuming that the assembly 1–5, 7, 9 is clamped between and movable as a unit with dies 11 and 13:

First, the gap is made smaller, as suggested at G, and the clamped assembly 1–5, 7, 9 moved therethrough (perpendicularly to the paper) for marginal squeezing and upsetting. As this occurs, current from the power source 23 flows as illustrated by the darts, being concentrated heavily across the Zircaloy interfaces in the margins of the assembly. This current concentration is aided by the fact that there is a narrow band of contact between each roll 19 and the assembly margin, as squeezing action takes place. As a result of the concentrated heavy current flow and concurrent squeezing action, the metal at the margins becomes heated and upset under the roll pressure to infill the notches 15 and apply pressure across the marginal interfaces of members 1, 3, 5, 7, 9. At the same time, interfacial bonding or welding occurs at the interfacial areas between members 1, 3, 5 on the one hand, and between members 7 and 9 on the other hand. Bonding or welding con be controlled by proper selection of current, to take place between the interfaces of plates 1, 3, 5 and strips 7, 9. These areas are located closer to the marginal concentrations of current. Bonding of the spacer plates 2 and 4 to the adjacent plates or spacers 7 and 9 can be obviated, for example, by proper spacing thereof from the current concentration or by the employment of suitable parting compounds. The rolls 19 do not become welded, because they are water-cooled.

To assure the desired localized bonding or welding condition, the amount of current from the power supplies 23 may be controlled by conventional means. For example, but without limitation, a range of currents within which appropriate adjustments may be made is 25–500 amperes. The exact amount depends upon various factors such as the number of plates 1, 3, 5 and spacers 7, 9 in the assembly, their compositions, the dimensions thereof, and the bonding or welding method selected, that is, whether it is to be of the solid-phase or liquid-phase type. In either case, the strips 7, 9 and margins of 1, 3 and 5 to be welded should be cleaned adequately prior to clamping the assembly such as shown in FIG. 1. Cleaning should be such as to remove gross contaminants and may include operations such as pickling, brushing, sanding or the like. Such cleaning operations will be found sufficient in the case wherein the marginal temperature is raised to the point at which welding will occur with the production of an interfacial liquid phase. In such case, complete welds will be obtained upon upsetting, requiring no subsequent heat treatment, except insofar as it may be desired to employ an annealing heat treatment in order to drive impurities from the weld area.

If it is desired to employ solid-phase bonding techniques during upsetting, preliminary cleaning may be required to be more meticulous, as set forth in Patent 2,691,815. For the other conditions of solid-phase bonding technique see for example said Patent 2,691,815, and for variations thereof see Patents 2,753,623 and 2,860,409. As said patents show, the use of solid-phase bonding techniques may result in partial (though substantial) bonds during upsetting which may be improved or completed by a subsequent heat treatment.

It should be understood that it is within the contemplation of the instant invention to provide a single-circuit arrangement whereby the current traverses the entire width of the plate assembly, in lieu of the multi-circuit arrangement, such as that described above.

After the assembly 1–5, 7, 9 emerges from its upset and bonded, partially bonded, or welded condition from the rolls 19, it has the outside shape indicated in FIG. 5 but includes the filler or spacer plates 2 and 4. After heat treatment (if indicated), the assembly may be placed in a suitable conventional selective etching bath, in order chemically to remove the metallic expendable filler or spacer plates 2 or 4, without attacking the metal of plates 1, 3, 5. In some instances, the spacers may be pressed out mechanically, particularly if, as may be the case, they have been coated with an antiwelding parting compound at the time they are organized into the assembly 1–5. 7, 9 prior to welding. Examples of such a parting compound might be molybdenum disulfide, or aluminum oxide ($Al_2O_3$). The use of such a compound makes less critical the current controls required to avoid bonding of the members 2 and 4. Spacers 2 and 4 will also be removed mechanically if composed, for example, of a ceramic which may crack during the process, thus facilitating removal.

It should be understood that suitable parting compounds could also be employed on the rolls to obviate sticking or bonding of the rolls 19 and 21 to the plates, providing such parting compounds are of sufficiently low electrical resistance and do not have other characteristics which would impede or preclude bonding of the plates.

After the filler members 2 and 4 have been removed, the subassembly product appears as shown in FIG. 5, the dotted lines 29 indicating certain flashing which may have occurred between the corners of the grooves 15 and rolls 19. This flashing may be removed by a suitable machining operation. Several subassemblies such as appear in FIG. 5 may subsequently be welded together in any suitable manner. It will be understood that if it might be desired to have no flange such as 17 on the final FIG. 5 product, the grooves 15 in FIG. 1 would be omitted.

It will be understood that while FIG. 5 represents a subassembly which is constituted by the above-mentioned Zircaloy alloy, it may be composed of other metals or alloys, and that the materials of the strips 7 and 9 need not be the same as the material of the plates 1, 3 and 5. Thus any malleable and weldable metals may be used for any of the members 1–5, 7, 9, whether the same or different. It will be understood that brittleness of plates such as 2 and 4 is not of any substantial disadvantage since their primary function is accurately to support plates 1, 3 and 5 under compression of the dies 11 and 13 and marginally to support the strips 7 and 9 under some pressure of rolls 19. Thus some cracking of plates 2 and 4 would not interfere with that function. Also, some cracking might be desirable for subsequent mechanical removal of a brittle type of plate 2 or 4. It will also be understood that while the number of plates in the product shown in FIG. 5 is three, any number such as two, or more than three, may be employed so that the finished article may become a complete assembly, rather than a subassembly.

In the case in which larger numbers of plates are to be bonded, wider rollers 19 will be required and it may be desirable to have additional current return rolls such as 21 acting on the die 11 and suitably placed in circuit with the electrical source 23.

Referring now more particularly to FIG. 2, a second form of the invention is shown, wherein like numerals designate like parts. In this figure the circuit-forming rolls 21 and the power source are not shown, but it will be understood that they are used in connection with the rolls 19 and the die 13, as in FIG. 1. This form of the invention is the same as that shown in FIG. 1, except that additional strips 31 are employed in the grooved notches 15 in order to produce the flanges 17. The object in this case is to minimize upsetting of the marginal material. It will be observed that, nevertheless, force is engendered transversely to the interfacial areas at which welding is to take place between strips 7, 9, 31 and the margins of the plates 1, 3 and 5 so as to press these areas together as bonding or welding proceeds. The remaining steps employed in the process according to FIG. 2 are the same as those according to FIG. 1.

In FIG. 3, wherein like numerals indicate like parts, is shown another form of the invention. In this form the filler strips such as 7 and 9 are dispensed with and the filler plates 2′ and 4′ are made essentially the same width as that of the plates 1′, 3′ and 5′, this assembly being held together by ungrooved dies 11′, 13′. Transverse plates or strips 33 are then introduced along the edges of the assembly 1', 2', 3', 4', 5' and run through teh rolls therewith, the rolls gap to be used being indicated at G', for example. The result will again be a product such as shown in FIG. 5, except that perhaps less accurately flat-faced flanges would be expected at 17, although the outer transverse faces of the assembly would be accurately flat. In this FIG. 3 form of the invention, it may be desirable that the spacer plates 2' and 4', if composed of metal, be provided with a parting compound such as above mentioned, so that they will not weld.

In FIG. 4 is shown a form of the invention in which like numerals designate like parts, this form being based upon the FIG. 1 form. The primary difference is that instead of having flat strips such as 7 and 9 in FIG. 1, the strips 35 are tapered outward from an inner base approximately as thick as the filler plates 2 and 4. In this arrangement, a substantial amount of upset is obtained with insurance of best bonding at the inner edges of the tapered strips 35, due to higher heat and current concentration and/or higher unit pressures brought about at these edges.

It will be noted that, in the form of the invention shown in FIGS. 1, 2 and 4, the planes of the interfacial bonds between the side strips and the margins of the plates to which they are welded extend in a direction which is parallel to the application of force from the rolls 19. It will be understood, however, that the upsetting action produces transverse pressure across these interfaces as they weld. In the case of FIG. 3, the welding planes between the plates 1', 3', 5' and transverse plates 33 are transverse to the direction of application of the pressure from the rolls 19. In any of these events, welding or bonding occurs under pressure.

Due to the water cooling of the rolls 19, bonding may not occur immediately adjacent the bonding rolls, but may begin at some small depth below the outer surfaces of the bonded assembly. In such event, the small unbonded portions may, if desired, be removed by machining the final product.

If it is desired to have the welding occur in the presence of an ambient protective atmosphere, such as for example argon or helium, to minimize oxidation, such an atmosphere may be provided conveniently by fixed nozzles appropriately directed adjacent the narrow contact regions between the rolls 19 and the bonding assemblies, thereby excluding air from this region. Nozzles 20 for such purpose are illustrated in FIG. 2, for example. Thus the invention provides for a much more convenient and compact arrangement for application of such a protective atmosphere than was heretofore the case wherein the entire assembly to be welded needed to be placed in a boxed space accommodating the assembly and the moving welding equipment. It is to be noted that by means of the invention the apparatus for providing the protective atmosphere is in a stationary location at the pressurizing rolls 19, so that in effect the materials to be bonded pass through this atmosphere, being subject while moving to bonding conditions within such atmosphere.

It will be seen that the invention, due to the marginal heating and upsetting action, provides not only for reliable bonds between the margins of the spaced plates, but also highly accurately formed shapes in the areas where the spaced plates are joined marginally. This accurate shaping is particularly effective in the forms of the invention shown in FIGS. 1, 2 and 4, wherein the metal upsetting squeezing actions of the opposite rolls 19 drive material into the die groove formations 15, leaving only narrow flashing material 29 (if any). Thus highly accurate subassemblies are produced such as shown in FIG. 5. Moreover, the bonds in these highly accurate marginal connections are established under conditions of metal flow due to upsetting, which occurs as the rolls squeeze the assembly, a condition which is conducive to the production of excellent bonds or welds.

In view of the above, it will be seen that the several objects of the invention are achieved and other advantageous results attained.

As various changes could be made in the above methods, constructions and products without departing from the scope of the invention, it is intended that all matter contained in the above description or shown in the accompanying drawings shall be interpreted as illustrative and not in a limiting sense.

I claim:

1. The method of producing marginally bonded spaced-plate assemblies comprising interleaving at least two clean plates of malleable metal with at least one weld-resistant spacer held therebetween, applying clean strips of malleable metal at opposite margins of said plates and applying opposed backing members to opposite sides of the outermost planes of the plates to form an assembly, moving the assembly through and relative to opposed contact squeezing rolls engaging the opposite margins of the assembly which are generally perpendicular to said outermost planes to deform said margins, passing current through the rolls, the edges of said plates and said strips to heat them when and where deformed to produce bonds between said plates and strips during squeezing, and removing the spaces.

2. Apparatus for producing edgewise bonds between an assembly of spaced plates with spacers therebetween and sidewise strips adjacent the margins of said spaced plates; comprising backing means adapted to hold said spaced plates and spacers in assembly and movable therewith, opposed rolls located at a roll station adapted to be set marginally to contact said assembly and sidewise strips for squeezing and marginal upsetting upon movement therethrough, and means for passing heating current through the contacts between the rolls and the marginal portions of said assembly, to bond the strips and the plates under conditions of simultaneous heating by the current and deformation by squeezing and upsetting.

3. Apparatus according to claim 2, including means at said roll station adapted to provide a flow of a protective atmosphere around said contacts.

4. Apparatus according to claim 2, wherein said backing means is in the form of a pair of dies engaging opposite sides of the assembly and shaped adjacent the margin of the assembly to form a matrix adapted to shape marginally upset material.

5. Apparatus for producing edgewise bonds between an assembly of spaced plates with spacers therebetween and sidewise strips adjacent the margins of said spaced plates, comprising conductive backing means adapted to hold said spacer plates and spacers, opposed pressure rolls located at a roll station adapted to contact the margins of said assembly for squeezing upon movement therethrough, and circuit means including said rolls and additional rolls at said station and engaging said conductive backing means adapted to pass heating current through the contacts between the rolls and said margins to bond the strips and the spaced plates under conditions of deformation by squeezing.

6. Apparatus according to claim 5, wherein said backing means is in the form of dies having marginal matrix-forming portions adapted to shape the margins as they are deformed by the pressure rolls.

7. Apparatus according to claim 6, wherein said matrix-forming portions are recesses in the dies adjacent the margins of the assembly.

8. Apparatus according to claim 5, wherein said backing means are provided with marginal recesses adjacent the margins of the outermost spaced plates adapted to receive additional strips.

9. Apparatus for producing marginal bonds between an assembly of interleaved plates, spacers and sidewise strips, comprising backing dies adapted to hold said plates and spacers together for movement with the strips, opposed contact rolls located at a roll station adapted to be set to receive said held plates, spacers and strips edgewise for movement between the rolls with marginal squeezing and deformation, means adapted to pass heating current through the roll contacts where deformation occurs, said dies being marginally formed to provide a matrix adapted to shape heated and deformed marginal material of the plates and spacers as they pass the rolls.

10. The method of producing marginally bonded spaced-element assemblies, comprising placing one each of two generally plane malleable metal plates on opposite sides of at least one removable spacer to hold apart adjacent margins of said plates, said spacer being adapted to resist welding, applying a marginal strip of malleable metal adjacent each of two oppositely disposed pairs of said margins, said margins and the marginal strips having been cleaned for bonding, applying opposed plate-backing dies on opposite sides of the outermost planes of the plates while leaving said oppositely disposed pairs of margins and said marginal strips at least partly unbacked to allow for some deformation thereof, simultaneously heating the marginal strips and said margins and squeezing them with a force directed across the strips and in the general direction of the planes of the plates to deform and bond each pair of the adjacent margins and its respectively adjacent marginal strip while said dies back and support substantial areas of the plates against deformation, and removing said dies and spacer.

11. The method according to claim 10, wherein each pair of adjacent margins of said plates is arranged to extend beyond the adjacent margin of the spacer to provide a recess, and wherein each strip is located in such a recess.

12. The method according to claim 11, wherein each strip is prepared with a cross section tapering from a thicker portion adjacent the spacer to a thinner outer portion.

13. The method of producing accurate marginally bonded spaced-element assemblies, comprising placing one each of two generally plane malleable metal plates on opposite sides of at least one removable spacer to hold apart adjacent margins of said plates, said spacer being adapted to resist welding, applying a marginal strip of malleable metal adjacent each of two oppositely disposed pairs of said margins of said plates, said margins and the marginal strips having been cleaned for bonding, applying opposed plate-backing dies on opposite sides of the outermost planes of the plates while leaving said oppositely disposed pairs of margins and said marginal strips at least partly unbacked to allow for some deformation thereof, rolling the marginal strips and said margins to squeeze them with a force directed across the strips and in the general direction of the planes of the plates to deform and to bond each pair of the adjacent margins and its respectively adjacent marginal strip while said dies back and support substantial areas of the plates against deformation, heating the plates and marginal strip in their regions of deformation, and removing said dies and spacer.

14. The method of producing marginally bonded spaced-element assemblies, comprising placing one each of two generally plane lengths of malleable metal plates on opposite sides of at least one length of a removable spacer to hold apart adjacent margins of said plates, said spacer being adapted to resist welding, applying an elongate marginal strip of malleable metal adjacent each opposite pair of said margins of said plates, said margins and the marginal strips having been cleaned for bonding, applying opposed plate-backing dies on opposite sides of the outermost planes of the plates while leaving their long margins and said marginal strips at least partially unbacked to provide for some deformation, moving the strips and plates with their backing dies relatively to and between pressure rolls adapted to engage the strips, passing heating current between the rolls and the strips and margins while said rolls squeeze them with a force directed across the strips and in the general direction of the planes of the plates to deform and to bond each pair of the adjacent margins and its respectively adjacent marginal strip while said dies back substantial areas of the plates against deformation, and removing said spacer.

15. The method according to claim 14, wherein each of said pair of adjacent margins of said two plates is arranged to extend beyond an adjacent margin of the spacer to provide a recess, and wherein each strip is located in such a recess and also has relative movement with respect to the pressure rolls.

16. The method according to claim 15, wherein each strip is prepared prior to location in its recess with a cross section tapering from a thicker portion adapted for placement adjacent the spacer to a thinner portion adapted for placement adjacent the roll which squeezes it.

References Cited by the Examiner

UNITED STATES PATENTS

| | | | |
|---|---|---|---|
| 787,742 | 4/1905 | Eigen | 78—90 |
| 2,138,982 | 12/1938 | Raydt | 29—494 |
| 2,834,102 | 5/1958 | Pflumm et al. | 29—497.5 X |
| 2,863,818 | 12/1958 | Smith et al. | 204—193.2 |
| 2,864,758 | 12/1958 | Shackelford | 204—193.2 |
| 2,928,930 | 3/1960 | Veale | 29—470.9 |
| 2,957,230 | 10/1960 | Johnson | 29—470.9 |

FOREIGN PATENTS

| | | |
|---|---|---|
| 5,644 | 12/1881 | Great Britain. |

JOHN F. CAMPBELL, *Primary Examiner.*

ROGER L. CAMPBELL, *Examiner.*

R. L. GOLDBERG, C. I. SHERMAN, P. M. COHEN, *Assistant Examiners.*